(12) United States Patent
Yazami et al.

(10) Patent No.: US 6,358,649 B1
(45) Date of Patent: Mar. 19, 2002

US006358649B1

(54) CARBONS CONTAINING FLUORINE, METHOD OF PREPARATION THEREOF AND USE AS ELECTRODE MATERIAL

(75) Inventors: Rachid Yazami, Saint Nazaire Saint Ismier; André Hamwi, Clermont-Ferrand; Pascal Hany, Grenoble, all of (FR)

(73) Assignee: Centre National de la Recherche Scientifique (FR)

( * ) Notice: Subject to any disclaimer, the term of this patent is extended or adjusted under 35 U.S.C. 154(b) by 0 days.

(21) Appl. No.: 09/171,605

(22) PCT Filed: Apr. 21, 1997

(86) PCT No.: PCT/FR97/00710

§ 371 Date: Jun. 22, 1999

§ 102(e) Date: Jun. 22, 1999

(87) PCT Pub. No.: WO97/41061

PCT Pub. Date: Nov. 6, 1997

(30) Foreign Application Priority Data

Apr. 26, 1996 (FR) .............................. 96 05311

(51) Int. Cl.⁷ ................................ H01M 4/58
(52) U.S. Cl. ................... 429/231.7; 423/449.4
(58) Field of Search ................. 429/231.7; 423/448, 423/449.4

(56) References Cited

U.S. PATENT DOCUMENTS

| | | | | |
|---|---|---|---|---|
| 4,116,880 A | * | 9/1978 | Olah | 252/429 R |
| 4,119,655 A | * | 10/1978 | Hulme | 260/440 |
| 4,431,567 A | * | 2/1984 | Gestaut et al. | 502/101 |
| 4,886,921 A | * | 12/1989 | Nalewajek | 570/170 |
| 5,175,066 A | * | 12/1992 | Hamwi et al. | 429/192 |
| 5,358,802 A | | 10/1994 | Mayer et al. | 429/218 |
| 5,558,954 A | | 9/1996 | Morrison | 429/218 |

FOREIGN PATENT DOCUMENTS

| | | |
|---|---|---|
| FR | 2512429 | 3/1983 |
| GB | 2137605 | 10/1984 |
| WO | WO 89/10328 | 11/1989 |
| WO | WO 90/07798 | 7/1990 |

OTHER PUBLICATIONS

Watanaba et al., Studies in Inorganic Chemistry 8, "Graphite Fluorides", pp. 30–32, 35–36, 50, 83, and 115, 1988 (no month).

Nakajima et al., Z. Naturforsch. 36b, Ternary Intercalation Compound of Graphite with Aluminum Fluoride and Fluorine, pp. 1419–1423 (1981) no month.

Nakajima, Fluorine–Carbon and Fluoride–Carbon Materials, pp. 12–31, 1995 (no month).

Hamwi, Synthetic Metals, 26 (1988), pp. 89–98, "Graphite Flourides Prepared at Room Temperature" (no month).

Kita et al., Journal of the American Chemical Society, 101:14, Jul. 4, 1979, pp. 3832–3841.

Database WPI, Section Ch, Week 8750, XP002021590 & SU1308550.

R. Yazami et al, "Graphite Fluoride Prepared at Mild Temperature for High Energy/High Power Density Lithium Batteries", *Mol. Cryst. Liq. Cryst.*, vol. 310, (1998), pp. 397–402.

\* cited by examiner

*Primary Examiner*—Carol Chaney
(74) *Attorney, Agent, or Firm*—Burns, Doane, Swecker & Mathis, L.L.P.

(57) ABSTRACT

The invention relates to new carbons containing fluorine. The carbons containing fluorine are obtained from a graphite or a mosaic textured graphitisable compound containing carbon. As a first step, the graphite or the carbon-containing compound is reacted with a gaseous mixture (HF+$F_2$) in presence of an $MF_n$ fluoride at a temperature range between 15° C. and 80° C., M representing an element selected among I, Cl, Br, Re, W, Mo, Nb, Ta, B, Ti, P, As, Sb, S, Se, Te, Pt, Ir, and Os and n representing the valency of the element M, with $n \geq 7$. As a second step, the compound obtained at the end of the first step is reacted with fluorine for 1 to 20 hours at a temperature range between 20° C. and 400° C. The invention is useful as an active electrode material.

22 Claims, No Drawings

CARBONS CONTAINING FLUORINE, METHOD OF PREPARATION THEREOF AND USE AS ELECTRODE MATERIAL

The present invention concerns a fluorinated carbon, a method for its preparation, and its utilization as active electrode material.

Fluorinated carbons, which comprise the fluorides of carbon and the carbon-fluorine intercalation compounds, are known for their applications as lubricants on the one hand, and as cathode materials in lithium electrochemical generators on the other hand. The first application is based on the low surface energies stemming from the presence of hydrophobic C—F groups. The second application is permitted by the relative facility of intercalation of lithium ions during the process of discharge of the generator, as well as by the marked reducing character of lithium as regards the C—F bond.

Various methods are known for the preparation of fluorinated carbons, and give different products.

Carbon fluorides have been obtained by direct fluorination. A process of direct fluorination of carbon was described in 1934 [O. Ruff et al., Z. Anorg. Allgem. Chem., 217, 1(1934)]. It enabled a gray compound to be obtained, of composition $CF_{0.92}$. A process of direct fluorination of graphite at temperatures of 410° C. to 550° C. enables a series of fluorinated carbons to be obtained, the composition of which was from $CF_{0.676}$ to $CF_{0.988}$ [W. Rüdorff et al., Z. Anorg. Allgem. Chem., 253, 281(1947)]. The carbon fluorides thus obtained correspond to a structure $(CF)_n$ in which the layers of carbon are constituted by an infinite network of hexagonal "chair form" cycles bonded together by an $sp^3$ type of bond. The C—F bond is purely covalent and the compounds are electrical insulators. Another method by direct fluorination, permitting a carbon fluoride having the formula $(C_2F)_n$ to be obtained, and in which the C—F bond is a covalent bond, was described by Y. Kita et al., J. Am. Chem. Soc., 101,3832 (1979).

The compounds thus obtained by direct fluorination, $(CF)_n$ in particular, are utilized at present as cathode material in commercial lithium batteries. These batteries discharge around 2.4 V to 2.5 V at a current density of about 1 mA/cm².

The essential characteristic of graphitic fluorides is the high energy of the C—F bond, which can be measured by, for example, ESCA (XPS) spectrometry and which gives values of the most intense peaks of the line $F_{1s} \geq 688.5$ eV and the line $C_{1s} \geq 290$ eV. Furthermore, the $sp^3$ hybridization of carbon brings about an increase of the length of the C—C bond within the hexagon. The parameter a of the structure, which is 2.46 Å in graphite, exceeds 2.50 Å in $(C_2F)_n$ and $(CF)_n$ [N. Watanabe et al., "Graphite Fluorides", Elsevier (1988), p. 50]. Moreover, in all the cases of direct fluorination of a natural or synthetic graphite or of a coke, the temperature of fluorination is necessarily greater than 400° C. if it is desired to obtain a compound which is rich in fluorine (F/C>0.6) which can be used in a battery.

Carbon-fluorine intercalation compounds, in which F/C<0.5, have been obtained by various methods of fluorination of carbon at ambient temperature. A first method consists of reacting graphite with a gaseous mixture of $F_2$+HF, and permits stage 1 intercalation compounds to be obtained with a composition going from $C_4F$ to $C_{3.6}F$ [W. Rüdorff et al., Chem. Ber., 80, 417 (1947)]. The stage s denotes the number of layers of carbon separating two successive layers of fluorine. Thus a compound of stage 1 has a sequence of lamination of the layers as C/F/C/F . . . , and a compound of stage 2 has the sequence F/C/C/F/C/C . . .

Another known method consists of causing graphite to react with fluorine in the presence of HF or of a metallic fluoride such as LiF, $SbF_5$, $WF_6$, $CuF_2$ or AgF, and enables intercalation compounds $C_xF$ of stages 1 to 4 to be obtained, with $2 \leq x \leq 16$ [T. Nakajima, et al., Z. Naturforsch. 36b, 1419 (1981)]. Likewise, the synthesis is known of similar products of stage 1 to stage 4 having a composition of $C_2F$ to $C_{10}F$, by reaction at ambient temperature of graphite with an atmosphere of $F_2$ containing a small quantity of a fluoride HF, $AsF_5$, $IF_5$ or $OsF_6$. In all the intercalation compounds thus obtained, the F/C ratio is at most equal to 0.5. Now it is known that the capacity of a generator containing a fluorinated carbon as active material of an electrode increases with the proportion of fluorine. A proportion of fluorine lower than 0.5 is thus insufficient. Moreover, the fluorine contained in these compounds is less strongly bound to carbon, permitting it to have a mobility between the planes. Because of this, the fluorine can disintercalate, become dissolved in the electrolyte, and react with the lithium electrode, bringing about a phenomenon of self-discharge. These intercalation compounds prepared in the presence of HF or of a metal fluoride have an ionic character when the fluorine content is very low (F/C<0.1), or an iono-covalent character for higher fluorine contents (0.2<F/C<0.5). In any case, the bonding energy measured by ESCA gives a value less than 687 eV for the most important peak of the $F_{1s}$ line and a value less than 285 eV for that of the $C_{1s}$ line [T. Nakajima, Fluorine-carbon and Fluoride-carbon, Chemistry, Physics and Applications, Marcel Dekker (1995) p.13]. Moreover, the carbon remains hybridized in $sp^2$ and the crystallographic parameter a in the plane remains in the neighborhood of 2.46 Å as in the case of graphite.

Carbon-fluorine intercalation compounds in which F/C>0.5 have been obtained by a method of fluorination by means of a gaseous mixture of HF, $F_2$, and a metallic or non-metallic fluoride $MF_n$ [A. Hamwi et al., Synt. Metals, 26, 89 (1988]. This method enables compounds of formula $CF_xM_y$ to be obtained, of stage 1, having a F/C ratio comprised between 0.52 and 0.8 and a M/C ratio comprised between 0.02 and 0.06. This method has a disadvantage, however, for the preparation of fluorinated carbons intended to be used as active electrode material. The compounds obtained have relatively little stability when used as active material of an electrode in an electrochemical generator having a lithium negative electrode. This instability becomes evident as a loss of capacity of the battery by self-discharge, particularly at higher temperatures. This loss is principally due to the high content of the impurity M. Moreover, the compounds in which the value of y is very low, near to the lower limit y=0.02, are difficult to obtain by this method.

The present invention has as its object to provide a new fluorinated carbon having a lower proportion of impurities and thus a good stability when used in an electrochemical generator having a lithium negative electrode, as well as a sufficient fluorine content for its use in an electrochemical generator.

The invention thus has as its object a fluorinated carbon, a method for its preparation, and its utilization as active material of the positive electrode in a battery whose negative electrode is a lithium electrode.

The fluorinated carbon of the present invention is characterized in that:

it corresponds to the formula $CF_xM_y$ in which x>0.6, y<0.018, and M represents an element chosen from among I, Cl, Br, Re, W, Mo, Nb, Ta, B, Ti, P, As, Sb, S, Se, Te, Pt, Ir and Os;

its crystallographic parameter a, corresponding to the line (100) of the lattice, is such that 2.46 Å$\leq$a$\leq$2.49 Å;

the C—F bond energy is characterized by the strongest lines $F_{1s}$, and $C_{1s}$ at positions such that 687.5 eV$\leq F_{1s}\leq$688.5 eV and 287 eV$\leq C_{1s}\leq$290 eV, in the ESCA spectra.

Such a bond energy corresponds to an iono-covalent type of bond.

The method for preparing a fluorinated carbon of the invention is characterized in that:

during a first step, a carbon compound chosen from natural or synthetic graphites and graphitizable carbons with a mosaic texture by a thermal treatment are reacted with a gaseous mixture (HF+$F_2$), in the presence of a fluoride $MF_n$ at a temperature between 15° C. and 80° C., where M represents an element chosen from among I, Cl, Br, Re, W, Mo, Nb, Ta, B, Ti, P, As, Sb, S, Se, Te, Pt, Ir and Os, and n represents the valence of the element M, with n$\leq$7;

during a second step, the compound obtained at the end of the first step is reacted with fluorine for 1–20 hours at a temperature between 20° C. and 400° C.

For the first step, there is preferably used a natural or synthetic graphite or a graphitizable carbon with a mosaic texture, having a particle size less than 100 μm, preferably between 4 and 30 μm. Among the graphitizable carbons, coal tar cokes and petroleum cokes are preferred.

The fluoride $MF_n$ is preferably chosen from among $IF_7$, $IF_5$, $BrF_5$, $ClF_3$, $ReF_6$, $WF_6$, $MoF_6$, $TiF_4$, $NbF_5$, $T_2F_5$, $PF_5$, $AsF_5$, $SbF_5$, $BF_3$, $SF_6$, $SeF_6$, $IrF_6$, $OsF_6$, $TeF_6$, and $PtF_6$. $IF_7$ and $IF_5$ are particularly preferred.

The gaseous mixture used during the first step of the method is preferably constituted by 0.8–1.2 moles of $MF_n$, 2–6 moles of HF, and 6–8 moles of $F_2$ for the treatment of 8–14 moles of C.

During the second step of the method, the temperature is preferably comprised between 20° C. and 200° C. when the starting compound is based on graphitizable coke, and between 80° C. and 400° C. when the starting compound is based on graphite. Moreover, it is preferable to operate under a partial pressure of $F_2$ comprised between $5\times10^4$ and $10^5$ Pa.

The first step of the method of the invention can be carried out either by introducing the compound $MF_n$ into the reactor or by preparing it in situ by direct action of fluorine on the element M or on one of its oxides $MO_q$ for which $2_q<n\leq7$, or on one of its lower fluorides $MF_p$ for which p<n$\leq$7.

The second step of the method can be carried out immediately after the first on the product as obtained. It can likewise be carried out after having washed the product obtained in the first step, for example with pure water or acidified water, or with an organic solvent chosen from among alcohols, ethers, esters or carboxylic acids, preferably having at most 8 carbon atoms.

The fluorinated carbons of the present invention are particularly useful as electrode materials in an electrochemical generator having a lithium negative electrode.

An electrochemical generator according to the invention comprises a lithium negative electrode and a positive electrode, with a separator placed between them, and an electrolyte. It is characterized in that the positive electrode contains, as active material, a fluorinated carbon:

which corresponds to the formula $CF_xM_y$ in which x>0.6, y<0.018, and M represents an element chosen from among I, Cl, Br, Re, W, Mo, Nb, Ta, B, Ti, P, As, Sb, S, Se, Te, Pt, Ir and Os;

of which the crystallographic parameter a, corresponding to the line (100) of the lattice, is such that 2.46 Å$\leq$a$\leq$2.49 Å;

in which the C—F bond energy is characterized by the strongest lines $F_{1s}$ and $C_{1s}$ at positions such that 687.5 eV$\leq F_{1s}\leq$688.5 eV and 287 eV$\leq C_{1s}\leq$290 eV, in the ESCA spectra.

In an electrochemical generator according to the invention, the positive electrode is constituted by a composite material comprising fluorinated carbon according to the invention, a compound assuring electronic conduction, and possibly a binder.

The material assuring electronic conduction can be chosen from among carbon blacks, acetylene black, powdered graphite, cokes, and carbon fibers.

As binder there can be used a poly(ethylene oxide), a PVDF (polyvinylidene fluoride), a EDPM (ethylene-propylene-diene monomer), a poly(acrylonitrile), or a styrene-butadiene rubber (SBR). The copolymerized PVDF sold by the company Elf Atochem under the name Kynar Flex is particularly preferred.

The negative electrode can be constituted by a foil or a film of lithium or of a metallic alloy of lithium (LiAl, for example), or of carbon-lithium ($Li_xC_6$, for example).

The electrolyte is a liquid electrolyte constituted by a salt in solution in a polar solvent. The salt can be chosen from among the compounds $LiAsF_6$, $LiBF_4$, $LiCF_3SO_3$, $LiClO_4$, $LiN(CF_3SO_2)_2$, $LiPF_6$. The solvent can be chosen from among diethyl carbonate, diethoxyethane, dimethoxymethane, dimethyl carbonate, propylene carbonate, ethylene carbonate, or γ-butyrolactone.

The separator can be based on a non-woven polyethylene and/or polypropylene. By way of example, a microporous film of polyethylene can be used, particularly a film sold by the company Hoechst Celanese under the name of Celgard 2400 or 2502.

The present invention is illustrated hereinbelow in more detail by means of examples of preparation of fluorinated carbons and examples of utilization of fluorinated carbons as the positive electrode active material in an electrochemical generator.

EXAMPLE 1

Preparation of Fluorinated Carbons

Various fluorinated carbons were prepared according to the method of the invention, starting from different initial carbons.

During the first step of the method, 120 g (10 moles) of carbon, previously degassed under vacuum at 300° C. for 5 hours, were introduced into the reactor. Then 266 g of $IF_5$ (1.2 moles) were added in the presence of 300 g (about 8 moles) of $F_2$ and of 120 g (6 moles) of HF. After 4 hours of reaction at ambient temperature, the reactor was degassed, with a nitrogen purge. The product of the reaction was then recovered and washed with water, then analyzed chemically and by ESCA.

The results of the analysis for the various products obtained are shown in Table 1 hereinbelow.

TABLE 1

| Initial carbon type | Mean particle size (μm) | Chemical composition | C—F bond energy (eV) $F_{1s}$* | $C_{1s}$* | Sample No. |
|---|---|---|---|---|---|
| GN**-4 | 4.2 | $CF_{0.75}I_{0.02}$ | 687.5 | 289.2 | GN-4F(I) |
| GN-8 | 8.5 | $CF_{0.7}I_{0.025}$ | 687.2 | 289.0 | GN-8F(I) |
| GN-18 | 18.2 | $CF_{0.72}I_{0.030}$ | 687.3 | 289.1 | GN-16F(I) |
| GN-32 | 32 | $CF_{0.69}I_{0.032}$ | 687.1 | 288.5 | GN-32F(I) |
| Coke A*** | 6.2 | $CF_{0.71}I_{0.032}$ | 687.2 | 289.1 | Coke AF(I) |

TABLE 1-continued

| Initial carbon type | Mean particle size (μm) | Chemical composition | C—F bond energy (eV) | | Sample No. |
|---|---|---|---|---|---|
| | | | $F_{1s}$* | $C_{1s}$* | |
| Coke B*** | 6.2 | $CF_{0.65}I_{0.040}$ | 685.8 | 287.1 | Coke BF(I) |

*Refers to the position of the most intense line.
**GN = natural graphite
***preliminary treatment at 1100° C.

Coke A has a mosaic structure, in contrast to coke B, which was used for comparison.

All of the compounds obtained after the first step have a parameter a such that 2.46 Å≦a ≦2.49 Å.

The second step of the method of the invention was carried out by introducing into a reactor about 300 g of the product obtained during the first step, then fluorine (about 1 to 2 moles), and then raising the temperature to 150° C. and maintaining this temperature for 2 hours.

The reactor was then cooled to ambient temperature, then degassed under a dry nitrogen purge for 2 hours.

The products obtained at the end of the second step were analyzed, and the results are reported in Table 2 hereinbelow.

TABLE 2

| Initial carbon type | Chemical composition | C—F bond energy (eV) | | Sample No. |
|---|---|---|---|---|
| | | $F_{1s}$* | $C_{1s}$* | |
| GN4 | $CF_{0.95}I_{0.012}$ | 687.8 | 289.5 | GN 4F(II) |
| GN8 | $CF_{0.91}I_{0.011}$ | 687.5 | 289.3 | GN 8F(II) |
| GN18 | $CF_{0.85}I_{0.015}$ | 687.7 | 289.4 | GN 16F(II) |
| GN32 | $CF_{0.80}I_{0.013}$ | 687.3 | 289.0 | GN 32F(II) |
| Coke A | $CF_{0.90}I_{0.014}$ | 687.5 | 289.3 | Coke AF(II) |
| Coke B | $CF_{0.75}I_{0.022}$ | 686.2 | 287.5 | Coke BF(I)I |

*Refers to the position of the most intense line.

The results in Table 2 show that the use of a starting carbonaceous compound which does not have mosaic texture gives a fluorinated carbon which has a relatively high iodine content.

EXAMPLE 2
Production of Electrochemical Generators According to the Invention

A generator according to the invention was set up in the form of a button battery, with each of the fluorinated carbons obtained, shown in FIG. 2. For comparison, button batteries were likewise set up with the fluorinated carbons shown in Table 1 and obtained at the end of the first step.

A lithium foil having a thickness of 150 μm was used as the negative electrode.

The electrolyte is a 1M solution of lithium perchlorate in a ternary mixture of propylene carbonate / ethylene carbonate / dimethoxyethane with a volume ratio of 1/1/2. The separator is a Celgard 2502 polyethylene film.

The positive electrode is constituted by a composite material obtained by pressing, under 2.5×10⁸ Pa, 30 mg of a mixture constituted by 80% by weight of one of the fluorinated carbons shown in Tables 1 and 2, 10% of acetylene black, and 10% of a polyvinylidene fluoride sold under the name Kynar Flex by the company Elf Atochem.

Each test cell thus constituted was subjected to a discharge at constant current while following the variations of potential as a function of time, as far as 1 volt. At the potential of 1 V, all of the fluorinated carbon is reduced by the lithium. The discharge routine imposed is C/10, C being the theoretical discharge capacity, which can be calculated from the theoretical capacity per unit mass.

The theoretical capacity per unit mass, expressed in mAh.g$^{-1}$, is:

$$Q=(x \cdot 96500 \cdot 1000)/(3600 \cdot M_{CFxMy})$$

where x corresponds to the number of electrons brought into play, and $M_{CFxMy}$ represents the molar mass of the fluorinated carbon.

The theoretical capacity of a test cell, expressed in mAh, is q=m.Q, m being the mass of active material $CF_xM_y$ expressed in g.

The discharge routine C/10 is defined by the imposed current i, given by the relationship q/10=i.

If the discharge is effected in a time t<10 hours, the practical capacity is $q_{pr}$=it (in mAh). Referred to the mass m, $q_{pr}$ gives the value of the practical density per unit mass, $Q_{pr}$ (mAh/g or Ah/kg)=$q_{pr}$/m, of the fluorinated carbon compound.

Table 3 gives the values of Q, $Q_{pr}$, and of the mean of the discharge potential e (V), as well as the energy density $D_E$ attained. $D_E$ (in Wh/kg) is obtained by the simplified relationship: $D_E$=$Q_{pr}$ (Ah/kg)×e (V).

TABLE 3

| Ref. of fluorinated compound | Theoretical capacity Q(mAh/g) | Practical capacity $Q_{pr}$ (C/10) mAh/g | Mean potential e (V) | Energy density $D_E$ (Wh/kg) |
|---|---|---|---|---|
| GN4F (I) | 698 | 602 | 3.00 | 1806 |
| GN8F (I) | 658 | 557 | 3.05 | 1700 |
| GN16F (I) | 654 | 564 | 3.02 | 1703 |
| GN32F (I) | 634 | 530 | 2.96 | 1569 |
| Coke AF (I) | 644 | 550 | 3.02 | 1661 |
| Coke BF (I) | 592 | 505 | 3.10 | 1566 |
| GN4F (II) | 806 | 705 | 2.96 | 2086 |
| GN8F (II) | 795 | 670 | 2.98 | 1997 |
| GN16F (II) | 758 | 680 | 2.89 | 1965 |
| GN32F (II) | 743 | 660 | 3.02 | 1881 |
| Coke AF (II) | 784 | 682 | 2.85 | 1944 |
| Coke BF (II) | 692 | 590 | 3.00 | 1770 |

The analysis of Table 3 shows that in every case the double fluorination effected by the method of the invention enables the capacity per unit mass of the fluorinated carbon to be increased with respect to a carbonaceous compound of the prior art obtained at the end of the first step, nevertheless without substantially decreasing the discharge potential. The result is an increase in the energy density. The performance of the fluorinated carbon BF(II), richer in iodine than the fluorinated carbons of the invention, is lower.

EXAMPLE 3
Study of the Electrochemical Behavior of Electrochemical Generators According to the Invention and Generators According to the Prior Art In this example, the electrochemical behavior of generators in the form of button batteries containing a fluorinated carbon according to the invention is compared with that of a similar battery containing a fluorinated carbon obtained at high temperature according to the methods of the prior art. The carbonaceous compound of the prior art, denoted here by HT-CF$_n$, was obtained by direct fluorination at 600° C. for 5 hours of the carbonaceous compound denoted hereinabove by GN4. This compound HT-CF$_n$ has the following characteristics: F/C=1.05, the crystallographic parameter in the plane a=2.53 Å, the C—F bond energy is characterized by the intense lines $F_{1s}$=689 eV and $C_{1s}$=290.5 eV in the ESCA spectra.

A battery according to the invention is denoted by "LT battery" and a battery according to the prior art is denoted by "HT battery". The LT batteries were produced in conformity with Example 2, starting from the fluorinated carbon GN4F (II) (for LT-$CF_{0.95}$) described in Table 2 hereinabove. The HT batteries were produced in conformity with Example 2, with the high temperature fluorinated carbon HT-$CF_n$ mentioned hereinabove.

The batteries were subjected to discharges with an increasing discharge routine C/n, where n denotes the number of hours theoretically necessary for the total reduction of the fluorinated carbon. The initial potential of each battery is given in Table 4, in which are likewise shown the mean discharge potential, the capacity per unit mass, and the energy per unit mass which were obtained.

TABLE 4

| Fluorinated carbon | Discharge routine | Initial potential (V vs Li/$Li^+$) | Mean discharge potential (V vs Li/$Li^+$) | Capacity per unit mass (Ah/$kg^{-1}$) | Energy per unit mass (Wh/$kg^{-1}$) |
|---|---|---|---|---|---|
| (HT-$CF_n$) | C/30 | 3.18 | 2.54 | 735 | 1867 |
| | C/20 | 3.19 | 2.52 | 726 | 1830 |
| | C/10 | 3.20 | 2.52 | 632 | 1592 |
| | C/5 | 3.20 | 2.46 | 640 | 1574 |
| | C/3 | 3.18 | 2.15 | 246 | 529 |
| (LT-$CF_{0.95}$) GN4F II | C/30 | 3.70 | 3.15 | 724 | 2280 |
| | C/20 | 3.77 | 3.10 | 709 | 2198 |
| | C/10 | 3.62 | 3.00 | 705 | 2115 |
| | C/5 | 3.78 | 2.97 | 681 | 2022 |
| | C/3 | 3.80 | 2.50 | 507 | 1268 |

It can be seen that the LT batteries of the invention have a high discharge potential, greater by about 25% than that of the HT batteries of the prior art.

In a rapid discharge routine, the LT batteries of the invention have a capacity and an energy per unit mass higher than those of the HT batteries of the prior art.

EXAMPLE 4

Accelerated Ageing of Generators According to the Invention and of Generators of the Prior Art A typical test of accelerated ageing consists of keeping a generator at a given temperature T and measuring the energy which it contains at the end of a given period t. In the following example, the trial was carried out at a temperature of 60° C. for 1 week, these values being adapted to the present type of electrochemical generators.

The discharge tests were carried out at the ambient temperature, under the same conditions as those described in Example 2, using a C/10 routine. Button batteries containing a fluorinated carbon according to the invention [GN4F(II), coke AF(II)] are compared to batteries containing a fluorinated carbon of the prior art [GN4F(I) and HT-$CF_n$] and to a button battery containing the fluorinated carbon BF(II).

Table 5 shows the comparative results obtained with samples before and after ageing. Those which were aged have the letter V in their reference. For the samples which were not aged, the results are identical to those given in Table 4.

For each sample, the relative fall of capacity $\Delta Q_{pr}/Q_{pr}$ and of energy density $\Delta D_E/D_E$ is given in % with respect to the initial values before ageing.

TABLE 5

| Sample Reference | $Q_{pr}$ (Ah/Kg) | $\Delta Q_{pr}/Q_{pr}$ (%) | e (V) | $D_E$ (Wh/Kg) | $\Delta D_E/D_E$ (%) |
|---|---|---|---|---|---|
| GN4F-(II) | 705 | | 2.96 | 2087 | |
| GN4F-(II)-V | 694 | 1.56 | 2.92 | 2026 | 2.9 |
| CokeAF-(II) | 682 | | 2.85 | 1944 | |
| CokeAF-(II)-V | 664 | 2.47 | 2.81 | 1866 | 4.0 |
| GN4F-(I) | 602 | | 3.00 | 1806 | |
| GN4F-(I)-V | 582 | 3.3 | 2.81 | 1635 | 9.5 |
| CokeAF-(I) | 550 | | 3.02 | 1661 | |
| CokeAF-(I)-V | 521 | 5.3 | 2.79 | 1463 | 12.5 |
| $CF_{1.02}$-HT | 632 | | 2.52 | 1592 | |
| $CF_{1.02}$-HT-V | 616 | 2.5 | 2.47 | 1521 | 4.46 |
| CokeBF-(II) | 590 | | 3.00 | 1770 | |
| CokeBF-(II)-V | 563 | 4.6 | 2.80 | 1578 | 10.8 |

Table 5 shows that:

(1) The second fluorination according to the invention considerably reduces the rate of self-discharge $\Delta Q_{pr}/Q_{pr}$ [GN4F(I): 3,3% and GN4F(II): 1.56%].

(2) The rate of self-discharge increases with the iodine content. The only compounds for which $\Delta Q_{pr}/Q_{pr} < 2.5\%$ are those for which $y < 0.018$, that is, GN4F II (y=0.012) and coke AF II (y 0.014).

(3) With respect to the rate of self-discharge obtained with the fluorinated carbon of the invention [GN4F(II) and coke AF (II)], the rate of self-discharge obtained with a fluorinated carbon which did not conform to the invention [coke B(II)] or with a sample of the prior art is either greater [for GN4 (I): 3.3%; for coke AF(I) : 5.3%; for coke BF(II) : 4.6%] or close (HT-$CF_n$ : 2.5%).

(4) The loss of energy density is improved with fluorinated carbons of the invention with respect to fluorinated carbon of the prior art and with respect to the fluorinated carbon derived from a graphitizable carbon which did not have the mosaic texture.

Thus the second fluorination according to the invention not only enables the energy density to be increased but also very significantly reduces the rate of self-discharge, which becomes of the same order as that of HT-$CF_n$ of the prior art, which is already very low.

What is claimed is:

1. Fluorinated carbon, characterized in that:
   it corresponds to the formula $CF_xM_y$ in which $x > 0.6$, $y < 0.018$, and M represents an element chosen from among I, Cl, Br, Re, W, Mo, Nb, Ta, B, Ti, P, As, Sb, S, Se, Te, Pt, Ir and Os;
   its crystallographic parameter a, corresponding to the line (100) of the lattice, is such that 2.46 Å $\leq$ a $\leq$ 2.49 Å;
   the C—F bond energy is characterized by the strongest lines $F_{1s}$ and $C_{1s}$ at positions such that 687.5 eV $\leq F_{1s} \leq$ 688.5 eV and 287 eV $\leq C_{1s} \leq$ 290 eV, in the ESCA spectra.

2. Method of preparing a fluorinated carbon according to claim 1, characterized in that:
   during a first step, a carbon compound chosen from natural or synthetic graphites and graphitizable carbons with a mosaic texture by a thermal treatment are reacted with a gaseous mixture (HF+$F_2$), in the presence of a fluoride $MF_n$ at a temperature between 15° C. and 80° C., where M represents an element chosen from among I, Cl, Br, Re, W, Mo, Nb, Ta, B, Ti, P, As, Sb, S, Se, Te, Pt, Ir and Os, and n represents the valence of the element M, with n $\leq$ 7;
   during a second step, the compound obtained at the end of the first step is reacted with fluorine for 1–20 hours at a temperature between 20° C. and 400° C.

3. Method according to claim 2, characterized in that the starting product for the first step is a natural graphite or a graphitizable carbon with a mosaic texture having a particle size of less than 100 μm.

4. Method according to claim 3, characterized in that the graphitizable carbon is a coal tar coke or a petroleum coke.

5. Method according to claim 3, characterized in that the fluoride $MF_n$ is chosen from among $IF_7$, $IF_5$, $BrF_5$, $ClF_3$, $ReF_6$, $WF_6$, $MoF_6$, $TiF_4$, $NbF_5$, $T_2F_5$, $PF_5$, $AsF_5$, $SbF_5$, $BF_3$, $SF_6$, $SeF_6$, $IrF_6$, $OsF_6$, $TeF_6$, and $PtF_6$.

6. Method according to claim 2, characterized in that the gaseous mixture used during the first step is constituted by 0.8 to 1.2 moles of $MF_n$, 2 to 6 moles of HF, and 6 to 8 moles of $F_2$, for the treatment of 8 to 14 moles of C.

7. Method according to claim 2, characterized in that, in the course of the second step of the method, the partial pressure of $F_2$ is comprised between $5 \times 10^4$ Pa and $10^5$ Pa.

8. Method according to claim 2, characterized in that the initial carbonaceous compound is a graphitizable coke and the temperature during the second step is comprised between 20° C. and 100° C.

9. Method according to claim 2, characterized in that the initial carbonaceous compound is a graphite and the temperature during the second step is comprised between 80° C. and 400° C.

10. Method according to claim 2, characterized in that the fluoride $MF_n$ is introduced into the reaction environment.

11. Method according to claim 2, characterized in that the fluoride $MF_n$ is formed in situ by direct action of fluorine on the element M or on one of its oxides $MO_q$ for which $2q < n \leq 7$, or on one of its lower fluorides $MF_p$ for which $p < n \leq 7$.

12. Method according to claim 2, characterized in that the product obtained at the end of the first step is washed before being subjected to the action of fluorine during the second step.

13. Positive electrode for a lithium electrochemical generator, characterized in that it contains as active material a fluorinated carbon according to claim 1.

14. Electrochemical generator comprising a lithium negative electrode and a positive electrode, between which a separator is placed, and an electrolyte, characterized in that the positive electrode contains, as active material, a fluorinated carbon:

which corresponds to the formula $CF_xM_y$ in which $x > 0.6$, $y < 0.018$, and M represents an element chosen from among I, Cl, Br, Re, W, Mo, Nb, Ta, B, Ti, P, As, Sb, S, Se, Te, Pt, Ir and Os;

which has a crystallographic parameter a, corresponding to the line (100) of the lattice, is such that 2.46 Å $\leq a \leq$ 2.49 Å;

of which the C—F bond energy is characterized by the strongest lines $F_{1s}$ and $C_{1s}$ at positions such that 687.5 eV $\leq F_{1s} \leq$ 688.5 eV and 287 eV $\leq C_{1s} \leq$ 290 eV, in the ESCA spectra.

15. Electrochemical generator according to claim 14, characterized in that the positive electrode is constituted by a composite material comprising, besides the fluorinated carbon, a compound which insures electronic conduction, and possibly a binder.

16. Electrochemical generator according to claim 15, characterized in that the material assuring electronic conduction is chosen from among carbon blacks, acetylene black, powdered graphite, cokes, and carbon fibers.

17. Electrochemical generator according to claim 15, characterized in that the binder is chosen from among a poly(ethylene oxide), a PVDF (polyvinylidene fluoride), a EDPM (ethylene-propylene-diene monomer), a poly (acrylonitrile), or a styrene-butadiene rubber (SBR).

18. Electrochemical generator according to claim 14, characterized in that the negative electrode can be constituted by a foil or a film of lithium or of a metallic alloy of lithium, or of carbon-lithium.

19. Electrochemical generator according to claim 14, characterized in that the electrolyte is a liquid electrolyte constituted by a salt in solution in a polar solvent.

20. Electrochemical generator according to claim 19, characterized in that the salt is chosen from among the compounds $LiAsF_6$, $LiBF_4$, $LiCF_3SO_3$, $LiClO_4$, $LiN(CF_3SO_2)_2$, $LiPF_6$.

21. Electrochemical generator according to claim 19, characterized in that the solvent is chosen from among diethyl carbonate, diethoxyethane, dimethoxymethane, dimethyl carbonate, propylene carbonate, ethylene carbonate, or γ-butyrolactone.

22. Electrochemical generator according to claim 14, characterized in that the separator is based on a non-woven polyethylene and/or polypropylene.

* * * * *

UNITED STATES PATENT AND TRADEMARK OFFICE
CERTIFICATE OF CORRECTION

PATENT NO. : 6,358,649 B1
DATED : March 19, 2002
INVENTOR(S) : Rachid Yazami et al.

It is certified that error appears in the above-identified patent and that said Letters Patent is hereby corrected as shown below:

<u>Title page,</u>
Item [86], should read:
-- [86] PCT No.: PCT/FR97/00710
§ 371 Date: Jan. 22, 1999
§ 102(e) Date: Jan. 22, 1999 --

Signed and Sealed this

Tenth Day of September, 2002

*Attest:*

*Attesting Officer*

JAMES E. ROGAN
*Director of the United States Patent and Trademark Office*